US007294159B2

(12) United States Patent
Oh et al.

(10) Patent No.: US 7,294,159 B2
(45) Date of Patent: Nov. 13, 2007

(54) CYCLONE SEPARATING APPARATUS AND VACUUM CLEANER HAVING THE SAME

(75) Inventors: Jang-keun Oh, Gwangju (KR); Hyun-ju Lee, Jeonju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 57 days.

(21) Appl. No.: 10/840,230

(22) Filed: May 7, 2004

(65) Prior Publication Data

US 2005/0050864 A1 Mar. 10, 2005

(30) Foreign Application Priority Data

Sep. 9, 2003 (KR) ...................... 10-2003-0063211

(51) Int. Cl.
*B01D 45/12* (2006.01)

(52) U.S. Cl. ......................... 55/343; 55/349; 55/459.1; 55/DIG. 3; 15/350; 15/353

(58) Field of Classification Search .................. 55/343, 55/346, 348, 349, 426, 459.1, DIG. 3; 15/350, 15/353
See application file for complete search history.

(56) References Cited

U.S. PATENT DOCUMENTS 1,207,034 A 12/1916 Harsant
1,416,885 A 5/1922 Schreiner
1,416,995 A 5/1922 Stroud
2,511,387 A * 6/1950 Watson et al. .............. 209/712
2,553,175 A * 5/1951 Davenport et al. ........... 55/343
3,425,192 A 2/1969 Davis
3,769,781 A 11/1973 Klein et al.
4,373,228 A 2/1983 Dyson
5,307,538 A 5/1994 Rench et al.
6,238,451 B1 5/2001 Conrad et al.
6,334,234 B1 * 1/2002 Conrad et al. ................ 15/347

(Continued)

FOREIGN PATENT DOCUMENTS

CN 1296801 A 5/2000

(Continued)

OTHER PUBLICATIONS

Chinese Patent Office, Office Action issued Jan. 20, 2006 with respect to Chinese Application No. 200410049368.3 filed on Jun. 10, 2004.

(Continued)

*Primary Examiner*—Robert A. Hopkins
(74) *Attorney, Agent, or Firm*—Blank Rome LLP

(57) ABSTRACT

Disclosed is a cyclone separating apparatus and a vacuum cleaner having the same. The cyclone separating apparatus includes a first cyclone for separating dust-ladened air, a plurality of second cyclones for separating fine dust particles via a second separation of dust using centrifugal force from air which was previously separated at the first cyclone, and an inlet-outlet cover installed on the upper part of the first cyclone and the second cyclones. The inlet-outlet cover allows fluid-communication between the first cyclone and the second cyclones, and discharge of dust-removed air from the second cyclone. Because the plurality of cyclones separates dust utilizing a compact structure, suction force deterioration is prevented and dust-collecting efficiency is increased.

8 Claims, 5 Drawing Sheets

U.S. PATENT DOCUMENTS

| | | | |
|---|---|---|---|
| 6,428,589 B1 * | 8/2002 | Bair et al. | 55/318 |
| 6,582,489 B2 | 6/2003 | Conrad | |
| 6,607,572 B2 | 8/2003 | Gammack et al. | |
| 6,746,500 B1 | 6/2004 | Park et al. | |
| 7,097,680 B2 | 8/2006 | Oh | |
| 7,169,201 B2 | 1/2007 | Oh et al. | |
| 2002/0066366 A1 | 6/2002 | Conrad et al. | |
| 2005/0050678 A1 | 3/2005 | Oh et al. | |

FOREIGN PATENT DOCUMENTS

| | | |
|---|---|---|
| CN | 1389175 | 1/2003 |
| CN | 1422187 | 6/2003 |
| CN | 1434688 | 8/2003 |
| DE | 2811536 | 11/1978 |
| DE | 10132690 | 7/2002 |
| DE | 10 2004 028 675 | 6/2004 |
| DE | 10 2004 028 677 | 3/2005 |
| DE | 10 2004 028 676 | 4/2005 |
| FR | 2619498 A1 | 2/1989 |
| FR | 2859370 | 3/2005 |
| GB | 835884 | 5/1960 |
| GB | 1 207 034 | 9/1970 |
| GB | 2360719 | 10/2001 |
| GB | 2374305 | 10/2002 |
| GB | 2377656 | 1/2003 |
| GB | 2381484 | 5/2003 |
| GB | 2375980 | 8/2003 |
| GB | 2406065 | 3/2005 |
| JP | 50-101012 | 8/1975 |
| JP | S52-14775 | 2/1977 |
| JP | 2002-051951 | 2/2002 |
| JP | 2002-172077 | 6/2002 |
| JP | 2002-326041 | 11/2002 |
| JP | 2003-024826 | 1/2003 |
| JP | 2003-116752 | 4/2003 |
| WO | WO 00/44272 | 9/1999 |
| WO | WO 01/74493 | 10/2001 |
| WO | WO 01/95780 | 12/2001 |
| WO | WO 02/067750 A1 | 9/2002 |
| WO | WO 02/067756 | 9/2002 |
| WO | WO 03/30702 | 4/2003 |

OTHER PUBLICATIONS

Spanish Patent Office, State of the Art issued Apr. 19, 2006 with respect to Spanish Patent Application No. 200402015 filed Aug. 12, 2004.

German Patent and Trademark Office, Office Action dated Jul. 4, 2006, with respect to German Application No. 102004028677.9 filed on Jun. 14, 2004.

Canadian Patent Office, Office Action issued Aug. 17, 2006, with respect to Canadian Patent Application No. 2,469,533 filed on Jun. 2, 2004.

Russian Patent Office, Office Action issued in Connection with Russian Patent Application No. 2004118404.

French Patent Office, Search Report issued Apr. 12, 2006, with respect to French Application No. 0406487 filed on Jun. 15, 2004.

British Patent Office, Combined Search and Examination Report Issued Oct. 29, 2004, with respect to British Patent Application No. 0412903.7.

Russian Patent Office, Office Action issued in connection with Russian Patent Application No. 2004120073.

Chinese Patent Office, Office Action issued Jan. 20, 2006, in connection with Chinese Patent Application No. 200410049219.7 filed on Jun. 2, 2004.

Spanish Patent Office, State of the Art Report issued Apr. 17, 2006, with respect to Spanish Patent Application No. 200401753, filed on Jul. 16, 2004.

Japanese Patent Office, Office Action issued Jun. 20, 2006 with respect to Japanese Patent Application No. 2004-46393 filed on Feb. 23, 2004.

German Patent Office, Office Action issued Jul. 11, 2006 with respect to German Patent Application No. 102004028678.7 filed on Jun. 14, 2004.

Russian Patent Office, Office Action issued in connection with Russian Patent Application No. 2004121431.

Chinese Patent Office, Office Action issued Jan. 6, 2006, with respect to Chinese Patent Application No. 200410049132.X.

Spanish Patent Office, Office Action issued March 16, 2006, with respect to Spanish Patent Application No. 200401731.

Korean Patent Office, Office Action issued Jul. 29, 2005, with respect to Korean Patent Application No. 2003-63211 filed on Sep. 9, 2003.

Japanese Patent Office, Office Action issued Dec. 19, 2006 with respect to Japanese Patent Application No. 2004-51806, filed Feb. 26, 2004.

French Patent Office, Preliminary Search Report issued Feb. 22, 2007, with respect to French Patent Application Number 0406250, filed Jun. 9, 2004.

* cited by examiner

CYCLONE SEPARATING APPARATUS AND VACUUM CLEANER HAVING THE SAME

REFERENCE TO RELATED APPLICATION

This application claims priority under 35 U.S.C. § 119 to Korean Patent Application No. 2003-63211, filed on Sep. 9, 2003, the entire content of which is incorporated herein by reference.

CROSS-REFERENCE TO RELATED APPLICATIONS

This application is related to copending applications entitled "Cyclone Dust Separating Apparatus and Vacuum Cleaner having the same" (U.S. application Ser. No. 10/840,231, filed May 7, 2004), "Cyclone Separating Apparatus and Vacuum Cleaner Equipped with the same" (U.S. application Ser. No. 10/840,229, filed May 7, 2004, now U.S. Pat. No. 7,097,680, issued Aug. 29, 2006), and "Cyclone Separating Apparatus and Vacuum Cleaner having the same" (U.S. application Ser. No. 10/840,248, filed May 7, 2004), whose disclosures are owned by the same assignee as the present application and are entirely incorporated herein by reference.

FIELD OF THE INVENTION

The present invention relates to a cyclone separating apparatus and vacuum cleaner having the same, and more particularly to a cyclone separating apparatus, comprising a first cyclone, a plurality of second cyclones, and an inlet-outlet cover installed on the upper part of the first cyclone and the second cyclones for communication between the first cyclone and the second cyclones, and, through which air from which dust has been separated at the second cyclone, is discharged.

BACKGROUND OF THE INVENTION

Generally, a cyclone separating apparatus operates to separate dust and dirt using centrifugal force by generating a rotational current inside of the cyclone chamber. The cyclone separating apparatuses are widely used in a variety of fields. U.S. Pat. Nos. 3,425,192 and 4,373,228 disclose embodiments adopting the structure of the aforementioned cyclone separating apparatus to the vacuum cleaner. The above-mentioned U.S. Patents disclose the cyclone dust-collecting apparatus for separating dust from dust-ladened air through a plurality of cyclones. In the construction, large dust particles are separated by the first cyclone, and cleaned air flows into the second cyclone or the auxiliary cyclone where it is filtered again to separate small dust particles or dirt. Purified air is discharged to the outside. U.S. Pat. No. 3,425,192 discloses that the auxiliary cyclone is arranged on the upper part of the first cyclone so that large dust particles are separated at the main cyclone (the first cyclone) and partially purified air flows into the auxiliary cyclone, where small dust particles are separated. U.S. Pat. No. 4,373,228 discloses a plurality of cyclone units in which the auxiliary cyclones are installed inside of the first cyclone. The conventional cyclone separating apparatuses, however, have the following problems.

First, the structure where the first cyclone is connected to the auxiliary cyclone is complicated, and the suction force generated from the main body of the vacuum cleaner is hard to deliver, thus causing the suction operation and cleaning efficiency to deteriorate. Secondly, since the arrangement of the first cyclone and the auxiliary cyclone is not compact, the cyclone separating apparatus indispensably requires to be large enough to adequately perform the dust-collecting operation. Accordingly, the vacuum cleaner with such a cyclone separating apparatus is bulky, difficult to maintain and causes an inconvenience to a user to operate. Thirdly, the conventional cyclone separating apparatuses are problematic in that since a connection path between the first cyclone and the auxiliary cyclone is complicated, a production process is complicated and, therefore, the number of parts and production costs are increased.

Thus, a heretofore unaddressed need exists in the industry to address the aforementioned deficiencies and inadequacies.

SUMMARY OF THE INVENTION

The present invention has been developed in order to solve the above drawbacks and other problems associated with the conventional arrangement. An object of the present invention is to provide a cyclone separating apparatus of a compact structure, and a vacuum cleaner having the same, which is capable of increasing dust-collecting efficiency in a plurality of the cyclone dust-collecting apparatuses, and also preventing deterioration of a suction force.

The foregoing and other objects and advantages are substantially realized by providing a cyclone separating apparatus for use in a vacuum cleaner, comprising a first cyclone for separating dust from dust-ladened air, a plurality of second cyclones for separating minute particles of dust from the dust-ladened air by secondly separating dust from the dust-ladened air with a centrifugal force, and, an inlet-outlet cover disposed on an upper part of the first cyclone and the second cyclones for a fluid-communication between the first cyclone and the second cyclones. Purified air cleaned by the second cyclone is discharged through the inlet-outlet cover.

The inlet-outlet cover includes an air channel connected in a manner that air discharged from the first cyclone flows into the second cyclone. A plurality of outlet channels penetrate in the inlet-outlet cover so air can be discharged therethrough from the second cyclone. A predetermined portion of the outlet channel is inserted into the second outlet when the inlet-outlet cover is joined to the second cyclone allowing air to discharge through the outlet channel.

One end of the outlet channel is connected to the second outlet formed on one side of the second cyclone, and the other end is open in an upward direction of the inlet-outlet cover. The other end of the outlet channel is cut into a slope inclining toward a central direction of the inlet-outlet cover.

The first cyclone includes a first chamber in which dust-ladened air is separated by a centrifugal force, a first inlet formed in the first chamber through which dust-ladened air flows, and a first outlet formed in the first chamber from which air is discharged. Each of the second cyclones includes a second chamber for separating dust a second time via a centrifugal force using air which was previously separated at the first cyclone, a second inlet formed in the second chamber through which air discharged from the first cyclone flows, and, a second outlet formed in the second chamber, through which dust-separated air is discharged.

The first chamber is formed substantially in a cylindrical shape, and the second chamber is formed wherein a predetermined part of one end is substantially in a frustum-conical shape. The cyclone separating apparatus further includes a cyclone cover installed on an upper part of the inlet-outlet cover. The cyclone cover is substantially in a conical shape with open upper and lower spaces. The second cyclones are installed on an outer periphery of the first cyclone to enclose the first cyclone, and, the first cyclone and the second cyclones are integrally formed. A separating partition is installed between the second cyclones.

The foregoing and other objects and advantages are substantially realized by providing a vacuum cleaner comprising a vacuum cleaner main body for generating a suction force to draw-in dust-ladened air, a bottom brush for drawing-in dust from a bottom which is a surface to be cleaned, wherein, the bottom brush is in fluid-communication with the vacuum cleaner main body. A cyclone separating apparatus is installed in the vacuum cleaner main body. The cyclone separating apparatus includes a first cyclone for separating dust-ladened air, a plurality of second cyclones for separating fine dust particles by separating air a second time using air which was previously separated at the first cyclone via centrifugal force, and an inlet-outlet cover installed on an upper part of the first cyclone and the second cyclones. The inlet-outlet cover provides fluid-communication between the first cyclone and the second cyclones, through which dust-removed air from the second cyclone is discharged.

The inlet-outlet cover includes an air channel connected in a manner that allows air discharged from the first cyclone to flow into the second cyclone, and, a plurality of outlet channels that penetrate through the inlet-outlet cover and allowing air to discharge from the second cyclone.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The above aspects and features of the present invention will be more apparent by describing certain embodiments of the present invention with reference to the accompanying drawings. The components in the drawings are not necessarily to scale, emphasis instead being placed upon clearly illustrating the principle of the present invention. Moreover, in the drawings, like reference numerals designate corresponding parts throughout the several views.

DETAILED DESCRIPTION OF THE PREFERRED EMBODIMENTS

Certain embodiments of the present invention will be described in greater detail with reference to the accompanying drawings.

Figure 1:
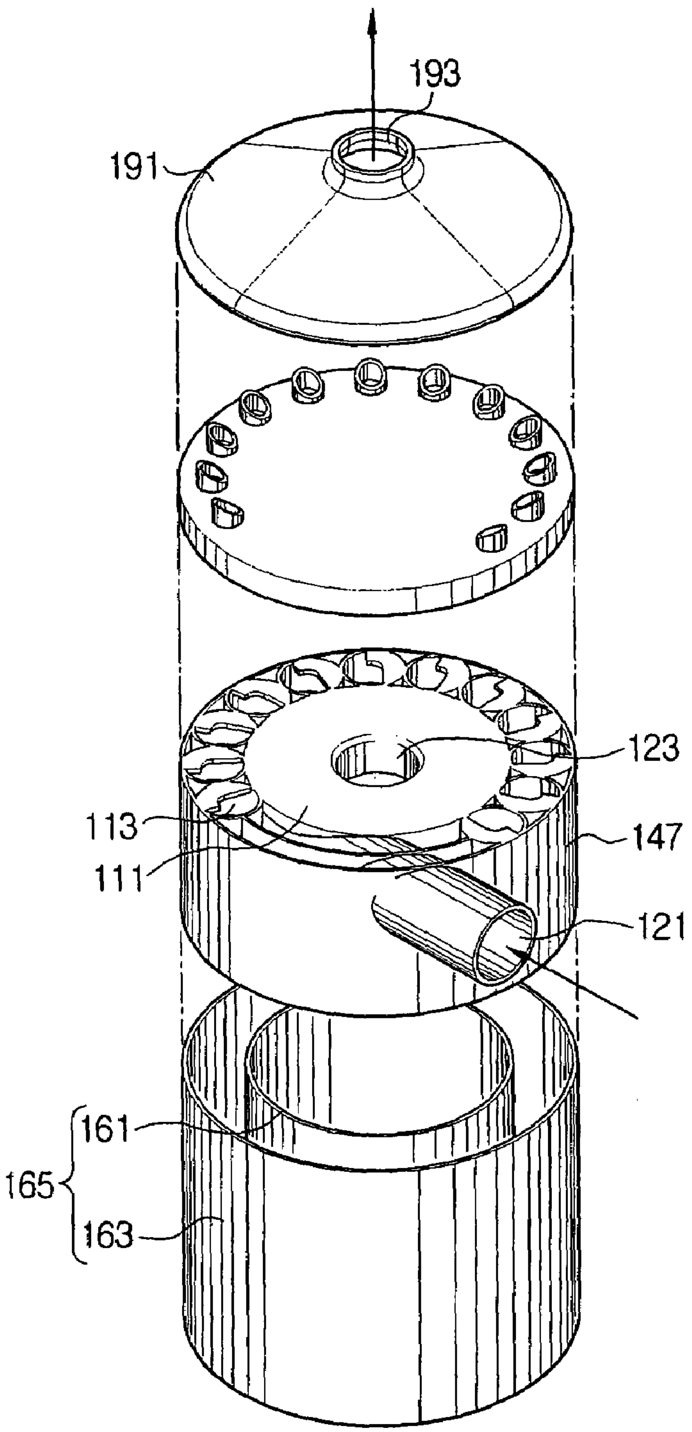
FIG. 1 is a drawing of an exploded, perspective view of a main part of a cyclone separating apparatus according to an embodiment of the present invention.
Figure 2:
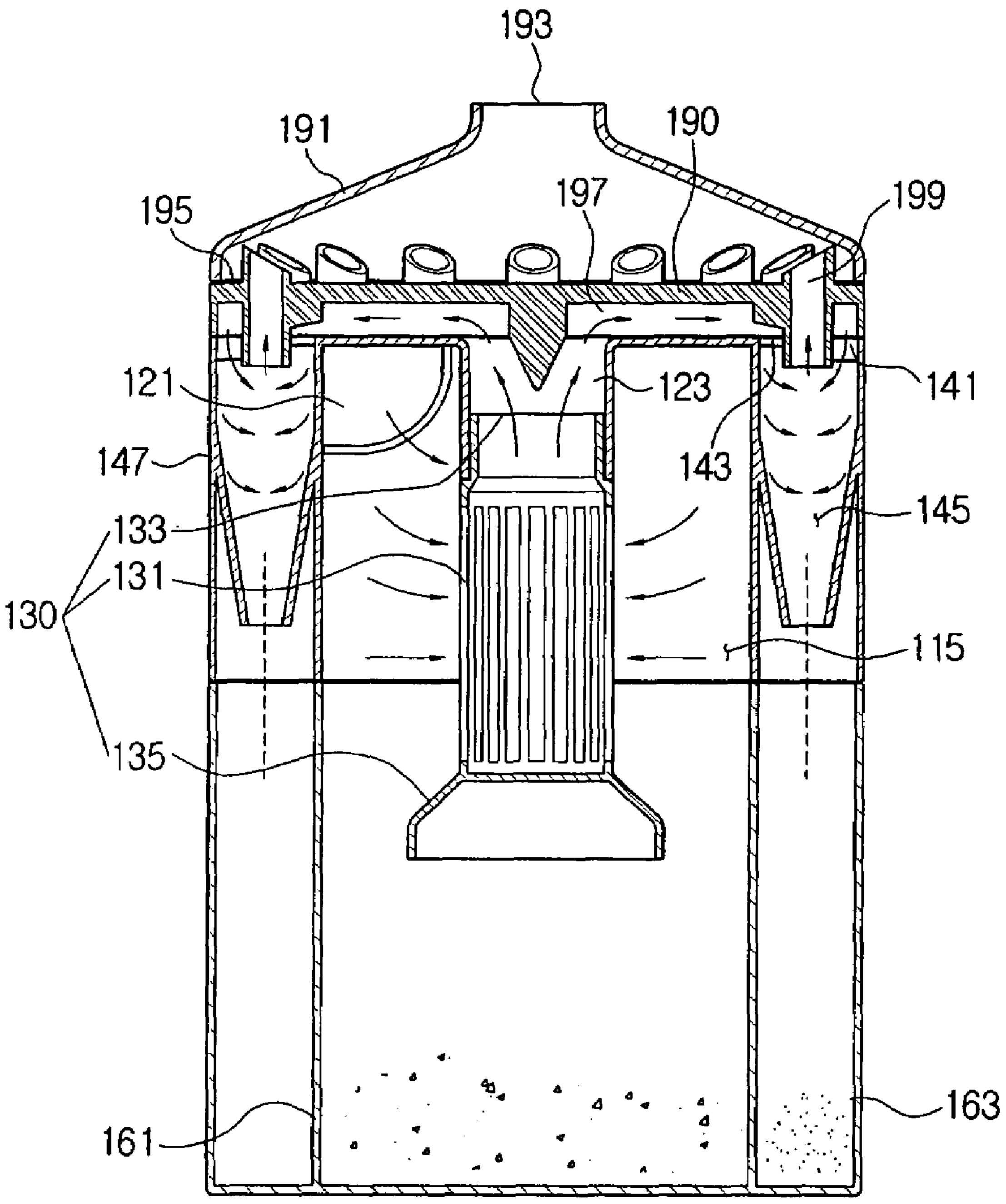
FIG. 2 is a drawing of a cross-sectional view of a cyclone separating apparatus according to an embodiment of the present invention.
Figure 3:
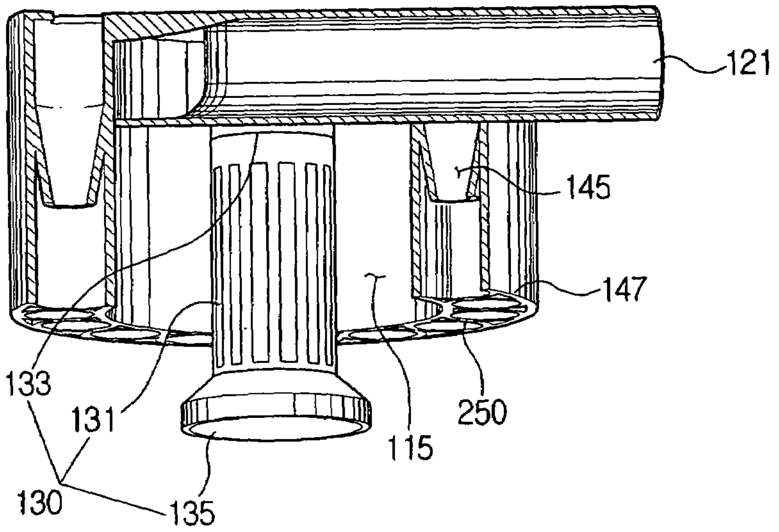
FIG. 3 is a drawing of a partially cut, perspective, cross-sectional view of a cyclone separating apparatus according to an embodiment of the present invention.

The cyclone separating apparatus according to a preferred embodiment of the present invention includes a first cyclone 111, a plurality of second cyclones 113, an inlet-outlet cover 190 installed on the upper part of the first cyclone 111 and the second cyclones 113, a cyclone cover 191, and a dust-collecting unit 165. A plurality of the second cyclones 113 is installed on the outer periphery of the first cyclone 111 enclosing the first cyclone 111. The first cyclone 111, and each of the second cyclones 113 are integrally formed, and a separating partition 250 is installed between the second cyclones 113 (refer to FIG. 3). The presence of the separating partition 250 increases the firmness of the cyclone separating apparatus 100 because the separating partition 250 partitions each of the second cyclones 113.

A chamber wall 147 is formed in a cylindrical shape around the second cyclones 113. The chamber wall 147 can assume a variety of polygonal shapes depending on the shape of the chamber wall 147 which is received in the vacuum cleaner main body 10 (refer to FIGS. 5 and 6).

The first cyclone 111 includes a first chamber 115, a first inlet 121, a first outlet 123, and a grill member 130. The first chamber 115 is formed in a cylindrical shape and separates dust from air via the centrifugal force of the rotating air current. The grill member 130 is installed in the upstream of the first outlet 123 to prevent dust separated from drawn-in air from flowing backward through the first outlet 123. The grill member 130 includes a grill body 131 with a plurality of channels, a grill opening 133, and a shielding member 135. The grill opening 133 is formed in one side of the grill body 131 for cleaned air to discharge, and is in fluid-communication with the first outlet 123. The shielding member 135 is formed on the other side of the grill body 131 and prevents separated dust from flowing backward.

The second cyclone 113 includes a second chamber 145, a second inlet 141, and a second outlet 143. The second chamber 145 is formed so that a predetermined part on one end is of a conical shape and separates dust-ladened air using centrifugal force. Air discharged from the first cyclone 111 flows into the second inlet 141, and air separated by the second chamber 145 is discharged to the second outlet 143 using centrifugal force.

Figure 4:
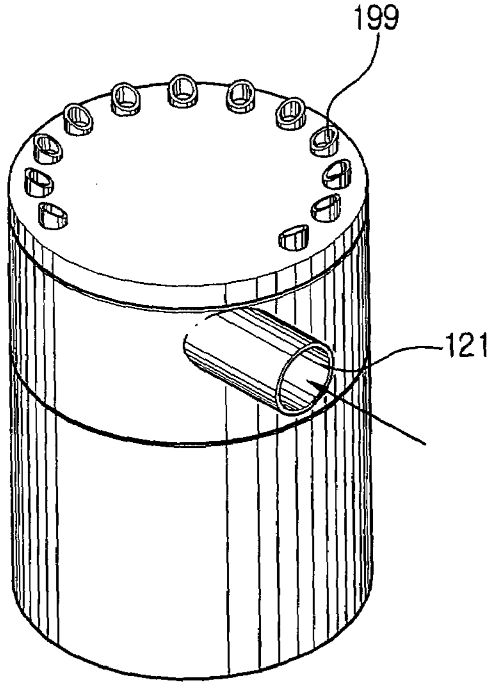
FIG. 4 is a drawing of a perspective view showing an inlet-outlet cover of a cyclone separating apparatus connected according to an embodiment of the present invention.

The inlet-outlet cover 190 is installed on the upper part of the first and second cyclones 111 and 113, and includes an air channel 197 for fluid-communication between the first outlet 123 of the first cyclone 111 and the second inlet 141 of the second cyclone 113, and an outlet channel 199. The outlet channel 199 is in fluid-communication with the second outlet 143 of the second cyclone 113, and is inserted into the second outlet 143 of the second cyclone 113. When the inlet-outlet cover 190 is joined to the second cyclone 113, a predetermined portion of the outlet channel 199 is inserted into the second outlet 143 so purified air can be discharged through the outlet channel 199. One end of the outlet channel 199 is connected to the second outlet 143 of the second cyclone 113, and the other end is open in an upward direction of the inlet-outlet cover 190. The other end of the outlet channel 199 is cut in an angle and slopes towards the center of the inlet-outlet over 190, allowing air discharged from the second cyclone 113 to easily accumulate at the cyclone cover 191 (refer to FIG. 4).

The cyclone cover 191 is formed in a conical shape with open upper and lower spaces. The cyclone cover 191 is detachably disposed with respect to the upper part of the inlet-outlet cover 190. Air discharged from the second outlet 143 of the second cyclone 113 accumulates and is discharged to the outside of the cyclone separating apparatus 100 through an upper opening 193 formed on the upper space of the cyclone cover 191.

The dust-collecting unit 165 includes a first dust-collecting bucket 161 and a second dust-collecting bucket 163. The first dust-collecting bucket 161 is formed integrally with the second dust-collecting bucket 163. The second dust-collecting bucket 163 may be formed as a hollow cylinder or substantially as a hollow cylinder. The second dust-collecting bucket 163 is detachably joined with respect to the chamber wall 147 which is formed on the outside of the second cyclone 113. The first dust-collecting bucket 161 may be formed as a hollow cylinder or substantially as a hollow cylinder. The first dust-collecting bucket 161 is formed inside of the second dust-collecting bucket 163, and is detachably joined with respect to the first chamber 115 of the first cyclone 111.

Figure 5:
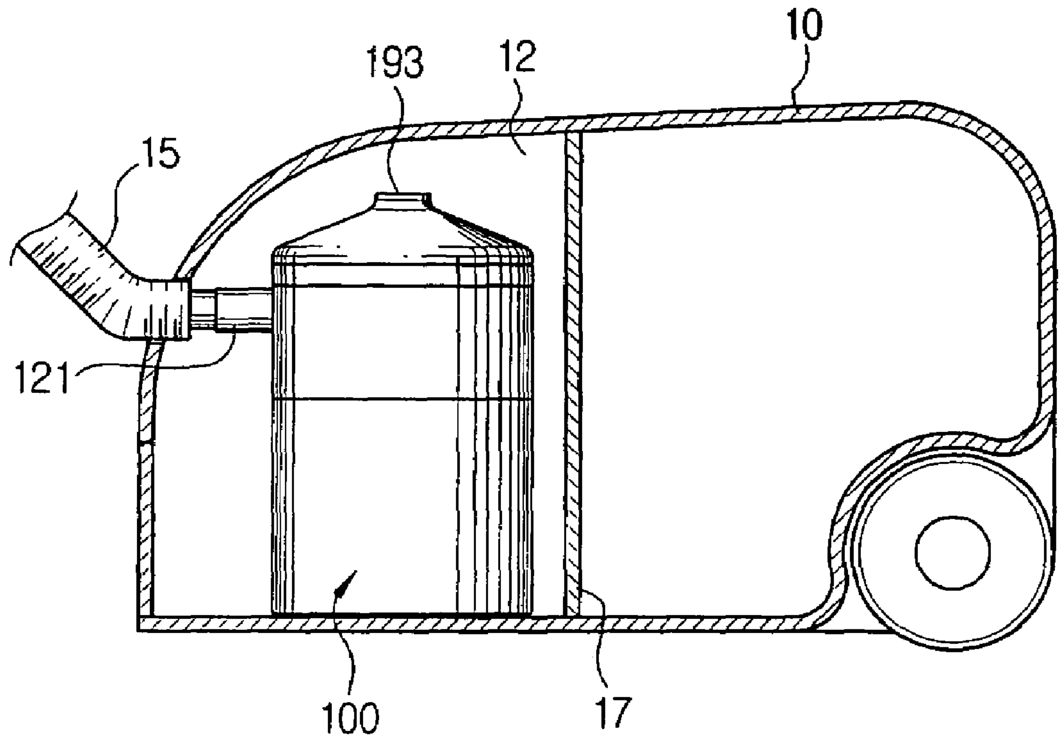
FIG. 5 is a drawing of a schematic, cross-sectional view of a canister-type vacuum cleaner adopting a cyclone separating apparatus according to an embodiment of the present invention.
Figure 6:
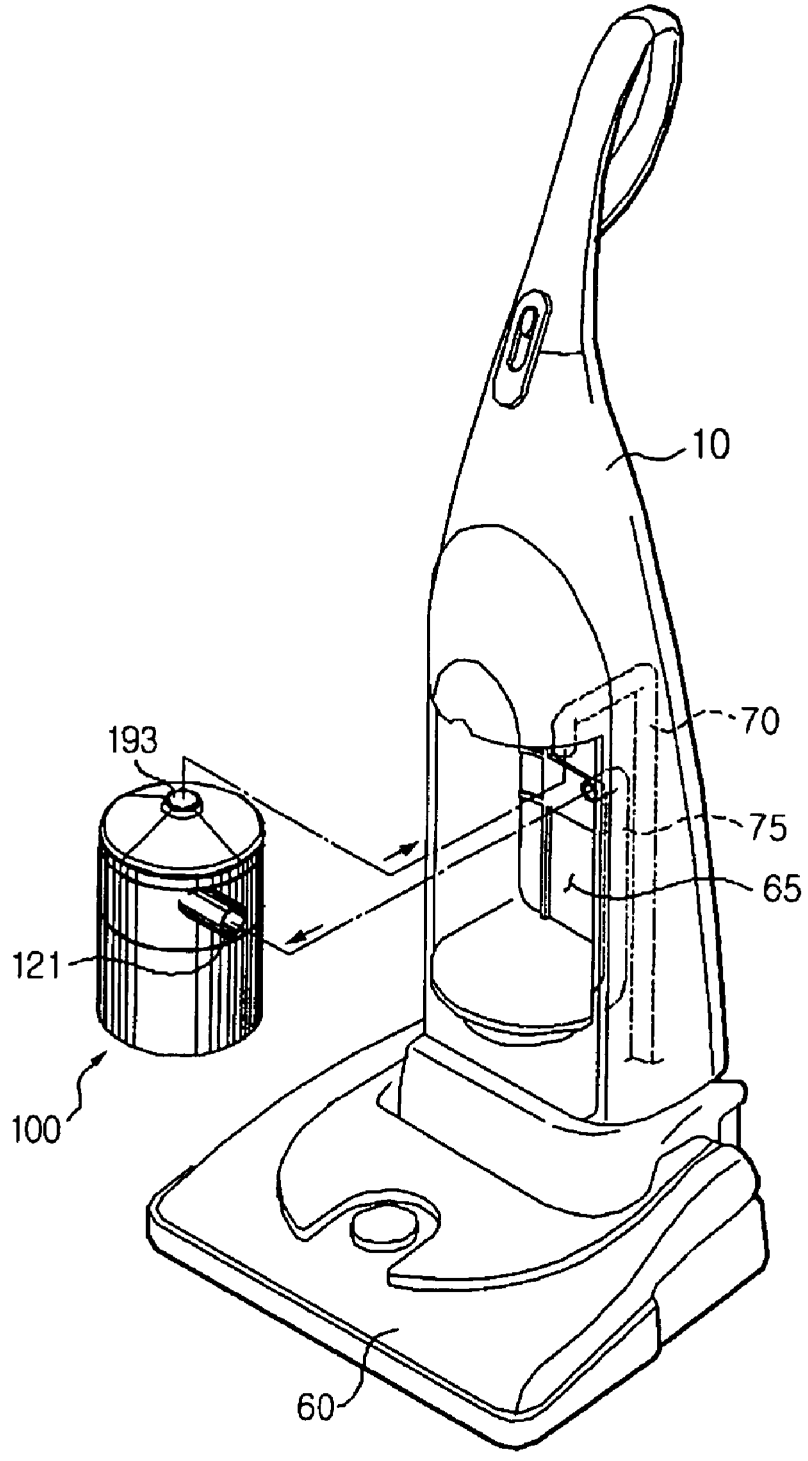
FIG. 6 is a drawing of a schematic, perspective view of an upright-type vacuum cleaner adopting a cyclone separating apparatus according to an embodiment of the present invention.

Hereinafter, a vacuum cleaner with the cyclone separating apparatus according to an embodiment of the present invention will be described As shown in FIG. 5, a dust-collecting room 12 is defined by a partition 17 formed in one side in the interior of the vacuum cleaner main body 10 and a cyclone separating apparatus 100 which is positioned inside the dust-collecting room 12. A first inlet 121 is formed in one side of the upper part of the periphery of the cyclone separating apparatus 100 for dust-ladened air to pass therethrough as air is drawn-into the cyclone separating apparatus 100 via a flexible hose 15 of the vacuum cleaner by the suction force generated using a motor (not shown).

An upper opening 193 is formed in the central part of the upper end of the cyclone separating apparatus 100 to allow air to pass therethrough when air ascends after the dust-filtering by the centrifugal force. The cyclone separating apparatus 100 can be employed in an upright-type vacuum cleaner as well as the canister-type vacuum cleaner. The upright-type vacuum cleaner adopting the cyclone separating apparatus 100 will be described with reference to FIG. 6 as described below.

A vacuum generating apparatus (not shown), i.e., a motor operating part, exists in the inside of a cleaner main body 10. A suction brush 60 is connected in a movable fashion with respect to the lower side of the cleaner main body 10, and a cyclone mounting part 65 is prepared on the front center of the cleaner main body 10. An air suction channel 70 which connects to the suction brush 60, and an air discharging channel 75 which connects to the motor operating part, also exist in the inside of the cyclone mounting part 65, respectively.

The first inlet 121 of the cyclone separating apparatus 100 is in fluid-communication with the air suction channel 70, and the upper opening 193 is in fluid-communication with the air discharging channel 75. Accordingly, dust and dirt are separated, while air drawn-in through the suction brush 60, passes through the cyclone separating apparatus 100. Purified air is discharged to the outside by way of the upper opening 193 and the air discharging channel 75.

The operations of the cyclone separating apparatus 100 with the construction described above and the vacuum cleaner with the same, will be described with reference to FIGS. 1-6 hereinafter.

As the suction force is generated at the vacuum cleaner main body 10, a bottom brush 60, which is connected to the vacuum cleaner main body 10, draws-in dust-ladened air from a surface to be cleaned. Air flows into the first chamber 115 in a tangential direction along the first inlet 121 of the cyclone separating apparatus 100 and is filtered at the first cyclone 111 by the centrifugal force. As a result, large particles of dust are separated from air and collected at the first dust-collecting bucket 161. In particular, the first cyclone 111 operates to separate large particles of dust from the drawn-in air using a suction force generated at the vacuum cleaner main body 10. The first chamber 115 of the first cyclone 111 generates the centrifugal force by rotating air flowing through the first inlet 121 along the inner wall of the first chamber 115 in a tangential direction with respect to the first chamber. Air, being relatively light in weight, is less influenced by the centrifugal force, and therefore, air converges on the central portion of the first chamber 115 and is discharged in a whirling air current toward the first outlet 123.

In contrast, dust or dirt is relatively heavy compared to air, and when subjected to the centrifugal force flows along the inner wall of the first chamber 115 and is collected at the first dust-collecting bucket 161.

Once-filtered air flows through the first outlet 123 of the first chamber 115, passes by the air channel 197 and into the second chamber 145 in a tangential direction through the second inlet 141 of the second cyclone 113. Since the air channel 197 is divided into small channels in a radial pattern from the center, one large air stream is branched into small air streams. Accordingly, the large air stream is efficiently divided in the second cyclone 113. Air that has flowed into the second chamber 145 is filtered again by the centrifugal force, so that small dust particles or dirt are separated and collected at the second dust-collecting bucket 163. The fine dust particles are collected at the second dust-collecting bucket 163 by a plurality of the second cyclones 113.

A separating partition 250 is formed between the second cyclones 113 and prevents, dust from flowing backward, and allows an efficient dust-collecting process when separated dust falls down to the second dust-collecting bucket 163. After the second dust-separation using centrifugal force, air flows through the second outlet 143 of the second cyclone 113, passes by the outlet channel 199 of the inlet-outlet cover 190, converges on the cyclone cover 191, and is discharged through the upper opening 193 formed in the upper part of the cyclone cover 191 (refer to FIG. 2).

The outlet channel 199 of the inlet-outlet cover 190 projects from the inlet-outlet cover 190, and the end of the outlet channel 199 is cut into a slope across its cross section, allowing discharged air to converge on the cyclone cover 191 more efficiently. An air discharging structure using slope-cutting can prevent suction force deterioration of the vacuum cleaner main body 10, and increases dust-collecting efficiency.

The second cyclone 113 separates the fine dust particles from air that have been filtered once at the first cyclone 111. In other words, the cyclone separating apparatus 100 improves dust-collecting efficiency by performing the initial dust-separation process at the first cyclone 111 and performing the second separation process at a plurality of the second cyclones 113. In the cyclone separating apparatus 100 as described above, the distance between the first outlet 123 of the first cyclone 111 and the second inlet 141 of the second cyclone 113 is reduced compared to the related art as disclosed in U.S. Pat. Nos. 3,425,192 and 4,373,228. Hence, suction force deterioration is prevented, and dust-collecting efficiency is improved. After the processes as described above, air from the cyclone separating apparatus 100 is discharged to the outside through the vacuum cleaner main body 10.

As is apparent from the foregoing, the conventional cyclone separating apparatus used to have a problem of low dust-collecting efficiency and was limited to some extent mainly in terms of suction force efficiency. However, through the improvement of the shape of the outlet channel of the inlet-outlet cover of the cyclone separating apparatus, a compact structure is realized, suction force deterioration is prevented, and dust-collecting efficiency is increased.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A cyclone separating apparatus for use in a vacuum cleaner, comprising:
- a first cyclone for separating dust from dust-ladened air;
- a plurality of second cyclones for separating minute particles of dust from dust-ladened air by a second separation of dust from dust-ladened air with a centrifugal force; and
- an inlet-outlet cover disposed on an upper part of the first cyclone and the second cyclones, for a fluid-communication between the first cyclone and the second cyclones, the inlet-outlet cover through which purified air cleaned by the second cyclone, is discharged.
- wherein:
- the inlet-outlet cover comprises an air channel connected such that the whole of air discharged from the first cyclone flows into at least one of the plurality of second cyclones,
- wherein the inlet-outlet cover comprises a plurality of outlet channels penetrating into the inlet-outlet cover so air can be discharged from at least one of the plurality of second cyclones,
- the first cyclone includes at least a first outlet,
- at least one of the plurality of second cyclones includes at least a second outlet, and
- at least a portion of the plurality of outlet channels is inserted into the second outlet so that cleaned air is discharged through the plurality of outlet channels,
- wherein one end of the outlet channel is connected to the second outlet formed on one side of the at least one second cyclone, and the other end is open in an upward direction of the inlet-outlet cover, and
- the other end of the outlet channel is cut into a slope inclining toward a central direction of the inlet-outlet cover.

2. The apparatus according to claim 1, wherein the first cyclone comprises:
- a first chamber in which dust-ladened air is separated by a centrifugal force;
- a first inlet formed in the first chamber, through which dust-ladened air flows, and
- the first outlet, which is formed in the first chamber from which air is discharged.

3. The apparatus according to claim 2, wherein each of the second cyclones comprises:
- a second chamber for separating dust a second time using a centrifugal force from air which was previously separated at the first cyclone;
- a second inlet formed in the second chamber, through which air discharged from the first cyclone flows; and
- the second outlet, which is formed in the second chamber, through which dust-separated air is discharged.

4. The apparatus according to claim 3, wherein the first chamber is formed substantially in a cylindrical shape and the second chamber is formed with a part of one end substantially in a frustum-conical shape.

5. The apparatus according to claim 1, wherein the cyclone separating apparatus further comprises a cyclone cover installed on an upper part of the inlet-outlet cover.

6. The apparatus according to claim 5, wherein the cyclone cover is substantially in a conical shape with open upper and lower spaces.

7. A vacuum cleaner comprising:
- a vacuum cleaner main body for generating a suction force to draw-in dust-ladened air;
- a bottom brush for drawing-in dust from a bottom, which is a surface to be cleaned, using the suction force, wherein the bottom brush is in fluid-communication with the vacuum cleaner main body; and
- a cyclone separating apparatus installed in the vacuum cleaner main body,
- wherein the cyclone separating apparatus comprises,
  - a first cyclone for separating dust-ladened air;
  - a plurality of second cyclones for separating fine dust particles by a second separation of air which was previously separated at the first cyclone using centrifugal force; and
  - an inlet-outlet cover installed on an upper part of the first cyclone and the plurality of second cyclones, for fluid-communication between the first cyclone and the plurality of second cyclones through which dust-removed air from the plurality of second cyclones is discharged.

8. The cleaner according to claim 7, wherein the inlet-outlet cover comprises:
- an air-channel connected to allow air discharged from the first cyclone flows into the second cyclone; and
- a plurality of outlet channels penetrating through the inlet-outlet cover allowing air to discharge from the second cyclone.

* * * * *